United States Patent [19]
Sasaki et al.

[11] 4,445,399
[45] May 1, 1984

[54] PROCESS FOR BALANCING A CRANKSHAFT

[75] Inventors: Takeshi Sasaki, Tokorozawa; Kiyoshi Akiba, Hidaka; Yoshio Takahashi, Kawagoe, all of Japan

[73] Assignee: Honda Giken Kogyo Kabushiki Kaisha, Tokyo, Japan

[21] Appl. No.: 289,311

[22] Filed: Jul. 30, 1981

Related U.S. Application Data

[63] Continuation of Ser. No. 100,218, Dec. 4, 1979, abandoned.

[30] Foreign Application Priority Data

Dec. 11, 1978 [JP] Japan ................. 53-151934

[51] Int. Cl.³ .................. B23K 1/20; B23K 27/00
[52] U.S. Cl. ........................................ 74/603; 29/6; 228/214; 228/222
[58] Field of Search ............ 74/603, 604; 29/6; 228/222, 214

[56] References Cited

U.S. PATENT DOCUMENTS

| | | | |
|---|---|---|---|
| 1,337,081 | 4/1920 | Kuhn | 74/603 |
| 1,489,699 | 4/1924 | David | 74/603 X |
| 2,014,225 | 9/1935 | Campbell et al. | 74/603 X |
| 2,288,068 | 6/1942 | Brebeck | 228/222 X |
| 3,103,066 | 9/1963 | Harman | 29/6 X |
| 3,593,409 | 7/1971 | Silverstein | 228/222 |
| 3,673,651 | 7/1972 | Stewart | 29/6 |
| 3,772,763 | 11/1973 | Henson et al. | 29/6 |

FOREIGN PATENT DOCUMENTS 40-10674  5/1965  Japan.

*Primary Examiner*—Horace M. Culver
*Attorney, Agent, or Firm*—Armstrong, Nikaido, Marmelstein & Kubovcik

[57] ABSTRACT

A process for balancing a crankshaft comprising applying balancing masses onto the outer peripheral surfaces of balancing weight parts of a crankshaft, by welding, in accordance with the degree of unbalance of the shaft and preliminarily forming recesses or projecting portions at positions radially inward of the balancing masses applied by welding to prevent transmission of thermal stress to central journal parts of the crankshaft and thereby preclude bending of the shaft.

4 Claims, 4 Drawing Figures

PROCESS FOR BALANCING A CRANKSHAFT

This is a continuation of application Ser. No. 100,218 filed Dec. 4, 1979 and now abandoned.

FIELD OF THE INVENTION

This invention relates to a balancing process for compensating for the unbalance of a crankshaft, chiefly for an internal combustion engine.

PRIOR ART

The inventors have previously proposed a balancing process of this type in which pads are built-up, by welding, on the peripheral surfaces of balancing weight parts of a crankshaft in correspondance with the degree of unbalance of the shaft. This process is disadvantageous in that, at the time of the welding, the shaft is subjected to a thermal stress and consequently, the shaft is liable to be bent thereby, so that high precision compensation becomes difficult.

SUMMARY OF THE INVENTION

An object of the invention is to provide a balancing process which avoids the aforementioned disadvantage.

In accordance with the invention, the peripheral surfaces of the balancing parts of the crankshaft are previously formed with recesses or projecting portions at positions inwards of the pads to be formed by the subsequent welding.

DETAILED DESCRIPTION

Figure 1:
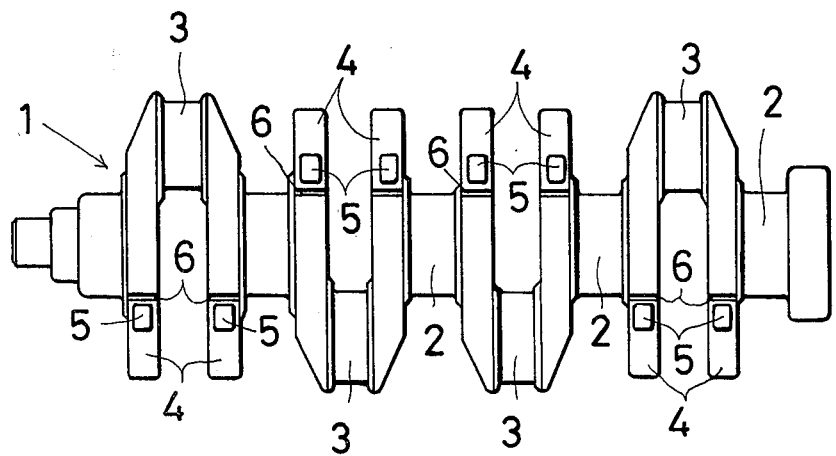
FIG. 1 is a side elevational view of one embodiment of a crankshaft according to the process of the invention.

Referring to the drawing, therein is seen a crankshaft, comprising pin parts 3 and pairs of balancing weight parts 4 for each pin. The pairs of weight parts 4 are disposed alternately on opposite sides of central journal parts 2. Pads or masses 5 are built up by welding on the left and right sides of the peripheral surface of each balancing weight part 4 for compensating for an unbalance of the shaft 1. The amount of the mass of weld 5 corresponds to the degree of unbalance of the shaft 1.

Up to this point the construction is similar to the known construction.

The invention seeks to prevent bending of the shaft by the thermal stress which is generated at the time of forming weld masses 5. For this purpose, the peripheral surfaces of the balancing weight parts 4 are formed with recesses or projecting portions at locations radially inwards of the pads 5 to be formed by the subsequent welding.

Figure 2:
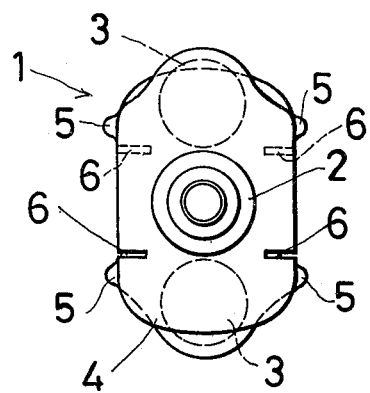
FIG. 2 is a front view of the crankshaft.
Figure 3:
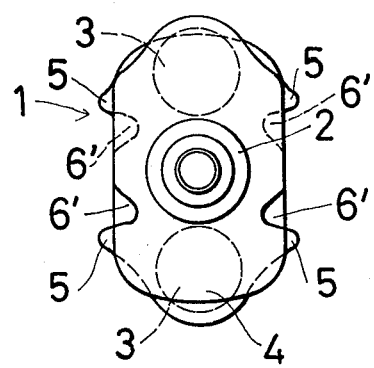
FIGS. 3 and 4 are front views of modified embodiments of the crankshaft.
Figure 4:
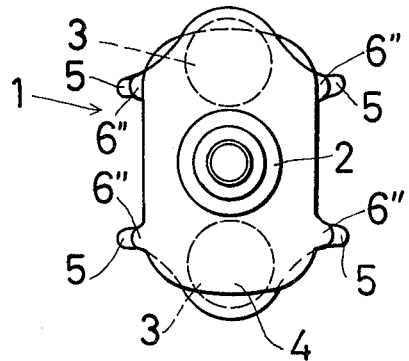

The recesses or projecting portions may take various forms. Namely, in FIG. 2 the recess is in the form of a slit 6, while in FIG. 3 it is in the form of a groove 6' and in FIG. 4 integral projecting portion 6" is in the form of a ridge.

Thus, according to this invention, the peripheral surfaces of the balancing weight parts are previously formed with recesses or projecting portions, at locations radially inwards of the pads to be formed by the subsequent welding, so that thermal stress produced at the time of the welding is cut off by the recesses or projecting portions so as not to produce any effect on the central journal parts, and thus there occurs no bending of the shaft and a high precision balancing compensation thereof can be achieved.

The recesses or projecting parts thus serve as thermal blocking means for preventing the transmission of thermal stress to the journal parts thereby preventing bending of the crankshaft.

What is claimed is:

1. In a crankshaft of the type having journal parts, eccentric pin parts, and balancing weight parts, each balancing weight part having an outer periphery said crankshaft being specifically intended for use in a weld-deposit method of final balancing of the crankshaft which includes depositing pads of weld metal on specific sites of the balancing weight parts in a manner known per se;

the improvement comprising each said balancing weight part having a recess extending radially inwardly from said outer periphery at a location intermediate said weld-deposit site and an adjacent journal of the crankshaft, said recess defining a complete air gap and effecting an increase in length of the thermal transmission path between said weld-deposit site and said adjacent journal.

2. In a crankshaft as defined in claim 1, wherein said recess is a slit.

3. In a crankshaft as defined in claim 1, wherein said recess is a groove.

4. In a method of final balancing a crankshaft of the type having journal parts, eccentric pin parts, and balancing weight parts, and in which said method includes depositing pads of weld metal on specific sites of said balancing weight parts in a manner known per se;

the improvement comprising providing a recess in each said balancing weight part radially extending inwardly from an outer periphery of the part of a location intermediate said weld-deposit site and an adjacent journal of the crankshaft, said recess defining a complete air gap and effecting an increase in in length of the thermal transmission path between said weld-deposit site and adjacent journal, and weld-depositing said pads solely at said weld-deposit sites.

* * * * *